3,257,478
PRESSURE SENSITIVE ADHESIVE COMPOSITIONS
Benjamin D. Jubilee, Jr., Plainfield, and Leonard J. Fox, Berkeley Heights, N.J., assignors to National Starch and Chemical Corporation, New York, N.Y., a corporation of Delaware
No Drawing. Filed Feb. 12, 1965, Ser. No. 432,422
20 Claims. (Cl. 260—901)

This invention relates to novel adhesive compositions and to a method for their preparation. More particularly, it relates to the preparation of compositions which are especially suited for use as pressure sensitive adhesives characterized by their excellent properties at elevated temperatures and, in particular, their outstanding creep resistance and cohesive strength.

As is known in the art, pressure sensitive adhesives comprise a class of adhesive compositions which may be formulated from a variety of materials such as gums and resins of both natural and synthetic derivation. When coated on a suitable substrate, these adhesive compositions share the common characteristic of being aggressively and permanently tacky at room temperature and are thus able to adhere to surfaces by the application of nothing more than manual pressure. Adhesives of this type may be applied to various substrates such as paper, cloth and plastic films, and the resulting coated substrate may then be converted to tapes and labels which are especially useful in the packaging field for any number of applications involving marking, sealing, reinforcing or banding.

In order to be satisfactory in commercial usage, a pressure sensitive adhesive must, of course, possess good tack and tack retention properties, that is, the adhesive must firmly adhere to various surfaces and the adhesive films thereof should retain their properties on aging. An equally important property of such an adhesive in many applications is that of high internal strength, i.e., good cohesion. High internal or cohesive strength is a necessary characteristic of any adhesive composition which is to be employed in preparing adhesive products which must support considerable amounts of weight. It is also necessary that the property of high internal strength be instilled in a pressure sensitive adhesive without adversely affecting its tack and tack retention properties. Previously, internal strength had been imparted to pressure sensitive adhesives by such means as incorporating high molecular weight polymers in the adhesive formulation. Methods such as these, however, have generally proved unsatisfactory since cohesive strength was attained only at the expense of sacrificing the tack and adhesion properties of the composition.

An additional property which is required of pressure sensitive adhesive systems which are to be exposed to elevated temperatures, is the ability to retain their adhesive characteristics at these elevated temperatures. Thus, in such areas as the automotive and building industries, where these adhesive systems may be used for the bonding of heat insulative, electrical and friction materials, it is essential that the adhesives retain their adhesive and cohesive strength upon prolonged exposure to elevated temperatures. One approach which has been used to provide such heat resistant properties, involves the utilization of organosilicone pressure sensitive adhesives. However, when the latter resins are utilized in heat resistant tapes, it is necessary to employ elaborate and costly priming and coating techniques in order to insure their proper application to a substrate. For the most part, the prior art pressure sensitive adhesives which have been formulated with low molecular weight gums and resins and which derive their basic tackiness from these gums and resins do not retain their superior adhesive properties when exposed to elevated temperatures. Thus, such properties as creep resistance and cohesive strength, etc., will suffer even when moderate concentrations of such low molecular weight, primary tackifiers are utilized in the preparation.

In our copending application, Serial No. 207,815, filed July 5, 1962, there is disclosed a novel class of pressure sensitive adhesives characterized by their excellent properties of tack, tack retention, and cohesive strength. However, the latter compositions have been found to provide rather poor results when utilized in applications which require their exposure to elevated temperatures.

It is therefore the object of this invention to prepare pressure sensitive adhesives which display excellent properties of tack, tack retention and cohesive strength over a wide range of elevated temperatures and which are further characterized by their ready adhesion to a wide variety of substrates. Another object of this invention is the use of said adhesives to prepare heat resistant pressure sensitive tapes and labels. Other objects and the advantages of this invention will be apparent from the following description.

In accordance with the invention, copolymer blends ideally suited for use in pressure sensitive adhesives which display excellent tack, tack retention and cohesive strength over a wide range of elevated temperatures, are prepared by blending a non-crosslinkable copolymer, i.e., a linear, one dimensional polymer which retains its one dimensional structure even upon heating and/or exposure to crosslinking catalysts, with a crosslinkable copolymer, i.e., a polymer which upon exposure to heat and/or the action of crosslinking catalysts cures into an interlaced, three dimensional structure. In such formulations, which are applicable for use at temperatures as high as about 450° F., we have found that the non-crosslinkable copolymer component imparts properties of tack, tack retention and adhesion to the blend, wheres the crosslinkable copolymer imbues the blend with high cohesive or internal strength. The necessity for having both these components present within our formulations is vividly demonstrated when attempts are made to prepare pressure sensitive adhesives operable over a wide range of elevated temperatures, which contain only one of these two types of copolymers or which do not contain them within the stated range of proportions. Thus, adhesive formulations containing only the crosslinkable copolymer are found to have high internal strength but display low tack and tack retention on aging as well as poor adhesion at elevated temperatuers. On the other hand, polymeric blends containing only the non-crosslinkable copolymers are characterized by high tack, adhesive strength and cohesive strength but show low peel strength at elevated temperatures. Furthermore, the non-crosslinkable copolymers cannot function independently at elevated temperatures because of their inherent thermoplasticity. It is therefore necessary, for the purposes of this invention, that both a non-crosslinkable and a crosslinkable copolymer are present in the adhesive blends.

The copolymer components utilized in the adhesive blends of this invention must be compatible with each other upon being admixed. We have, surprisingly, found that these copolymers need not be substantially similar in composition in order to provide the desired compatibility. Thus, the excellent compatibility displayed in the adhesive blends of this invention is achieved in part through the combination of copolymers which are dissolved in compatible solvents and is aided as well, by the polarity of the respective copolymers. Though several similar monomers may be used in both types of copolymers, additional monomers are, of course, present in the crosslinkable copolymers for the purpose of permitting such copolymers to become crosslinked by the action of heat and/or catalysts.

It should be mentioned that the only preliminary treatment required of the polymer blends of this invention is the addition of an appropriate catalyst, which serves to accelerate and promote the self-cure of the crosslinking component of the blend. The concentration of such catalysts may range from about 0.1 to 1.0%, by weight, as based on the crosslink polymer solids. We have found that para-toluene sulfonic acid is a catalyst which is of particular utility in the curing of our formulations. Other applicable catalysts include 5 sulfo-salicylic acid and varied alkyl phosphoric acids.

In addition, however, relatively mild curing temperatures in the range of 150 to 275° F. or the high temperatures encountered in the use of the novel polymeric blends of this invention will cure, i.e., crosslink, in situ the films derived from our blends thereby developing the high peel strength which is lacking in the individual components of our novel blends.

The non-crosslinkable copolymers which may be used in formulating the adhesive blends of our invention comprise copolymers containing from about 55 to 80 parts by weight of total polymer, of octyl acrylate; from about 5 to 20 parts by weight of total polymer, of ethyl acrylate; from about 10 to 30 parts by weight of total polymer, of vinyl acetate; and from about 4 to 10 parts by weight of total polymer, of maleic anhydride. Such copolymers have a glass transition temperature (Tg) of from about −45 to −65° C. and a preferred intrinsic viscosity, in acetone at 25° C., of at least 0.90. Such copolymers are more particularly described and claimed in the copending application of Berry A. Brooks and Benjamin D. Jubilee, Jr., Serial No. 426,424, filed January 18, 1965. Thus, the non-crosslinkable copolymers may be prepared by heating a mixture containing the required proportions of octyl acrylate, ethyl acrylate, vinyl acetate, maleic anhydride and the selected solvent, in the presence of about 0.1 to 0.3%, by weight of the total monomer charge, of a free radical initiator such as benzoyl peroxide or azobisisobutyronitrile. The heating of the latter monomer solution should proceed for about 1 to 2 hours at the reflux temperature of the system, whereupon additional solvent is usually added so that the polymer resin solids content of the copolymer lacquer may be maintained within the desired range of from about 38 to 40%, by weight. Polymerization is then completed by heating the reaction mixture for an additional 6 to 8 hours at its reflux temperature.

Crosslinkable copolymers applicable for use in our blends may readily be prepared by polymerizing mixtures of monomers, such as vinyl acetate and alkyl esters of acrylic or methacrylic acid wherein said alkyl groups contain from 2 to 8 carbon atoms, with about 0.5 to 10.0% by weight of the resulting copolymer, of a crosslinkable monomer selected from the group consisting of N-methylol acrylamide and N-methylol methacrylamide. Thus, typical monomer mixtures applicable for use in the preparation of these crosslinkable copolymers would include, for example, blends of vinyl acetate, octyl acrylate, ethyl acrylate and N-methylol acrylamide; blends of vinyl acetate, butyl acrylate and N-methylol acrylamide; and, blends of ethyl acrylate and N-methylol acrylamide. It should be noted that while the copolymers containing the above described crosslinkable monomers do not require a catalyst and/or heat in order to cure satisfactorily, it is, nonetheless, preferable to use a catalyst so that curing may proceed under relatively mild conditions.

Methods for polymerizing both the non-crosslinkable and the crosslinkable copolymers, described hereinabove, are well known to those skilled in the art. Since both the crosslinkable and non-crosslinkable copolymers are generally used in lacquer form, as will be subsequently described, it is convenient to prepare each type of copolymer by means of an organic solvent polymerization technique. Thus, as described hereinabove for the non-crosslinkable copolymer lacquer, these techniques involve the application of heat to organic solvent solutions containing the respective monomers dissolved therein along with an organic solvent soluble polymerization catalyst such, for example, as benzoyl peroxide or azobisisobutyronitrile.

The actual process involved in preparing our novel adhesive polymer blends necessitates merely that the respective lacquers containing the non-crosslinkable and the crosslinkable copolymers dissolved therein be admixed with one another and preferably in the presence of a catalyst, as described hereinabove. Examples of the solvents used to prepare the respective polymer lacquers include ethyl acetate, toluene, pentane, hexane, methylene chloride, cyclohexane, decahydronaphthalene, tetrahydronaphthalene and similar compounds. In some cases, additional solvents may also be included so as to maintain a total polymer solids content of from about 20 to 60%, by weight. The ratio of the concentration of non-crosslinkable polymer solids to crosslinkable polymer solids may range from about 50:50 to 90:10 and preferably from about 70:30 to 85:15, on a weight basis.

After our novel adhesive formulations have been coated onto a suitable substrate, the resulting film or coating may be subjected to mild heating conditions so as to effect the crosslinking of the crosslinkable copolymer component. Thus, our adhesives may be cured by being heated at about 250° F. for about two minutes or by allowing the films or coatings to air dry at room temperature. As previously mentioned, the heat encountered in high temperature applications may also serve to cure the crosslinkable copolymer component of such films.

Various additives may be incorporated in the adhesive blends of our invention in order to modify the properties thereof. Among these additives may be included: tackifiers, such as hydrogenated methyl esters of rosin, diethylene glycol esters of rosin, and rosin derived alkyd resins; fillers and pigments, such as talc, titanium dioxide, and calcium carbonate; and antioxidants.

In using the lacquers containing the novel adhesive blends of our invention, they may be applied to substrates by means of any coating technique whose use is desired by the practitioner. Thus, these copolymer lacquers may be sprayed onto a substrate or they may be applied by the use of any mechanical coating process, such as air knife, trailing blade, reverse roll, or gravure coating techniques. In addition, the adhesive lacquer may be applied by the transfer of its free film onto the preferred substrate. Inasmuch as the cast films derived from our novel polymer blends are usually exceedingly tacky, they are applied at coating weights which give a dry film thickness of about 0.4 to 2.4 mils. The coating weights at which these lacquers are applied will, of course, vary according to the particular polymer blend and its specific end use application.

Our adhesive compositions may be coated onto a virtually unlimited variety of substrates, including paper, cloth, paperboard, metal sheets and foils, fiber glass, foamed plastics, rubber, cellophane, wood and plastic films and sheets, such as those derived from polyethylene terephthalate, polystyrene, rubber hydrochloride, polyethylene, polypropylene, polyvinyl chloride and polyvinylidene chloride. Moreover, these novel adhesive products may be used for the bonding and lamination of any of the above listed substrates.

In the following examples, which further illustrate the embodiment of our invention, all parts given are by weight unless otherwise indicated.

*Example I*

This example describes a number of our novel polymer blends.

In preparing these formulations, the procedure utilized involved the blending of the respective non-crosslinkable and crosslinkable copolymer lacquers with the subsequent addition of 0.35%, by weight of the crosslinkable polymer solids, of a para-toluene sulfonic acid catalyst. The catalyst was added to the blend in a 20%, by weight, N-propanol solution.

| Formulation No. | Composition of Blend | | | | | |
|---|---|---|---|---|---|---|
| | Non-crosslinkable Copolymer Lacquer | | | Crosslinkable Copolymer Lacquer | | |
| | Copolymer Composition | Percent Polymer Solids | Solvent Blend | Copolymer Composition | Percent Polymer Solids | Solvent Blend |
| 1 | 20:70:10:7.5 vinyl acetate: octyl acrylate:ethyl acrylate:maleic anhydride. | 40 | 1:1 methylene chloride: toluene. | 20:30:50:4 vinyl acetate: octyl acrylate:ethyl acrylate:NMA (N-methylol acrylamide). | 45 | 1:75:2.25:1 methyl alcohol: isopropyl acetate:N-propanol. |
| 2 | ----do---- | 40 | ----do---- | 35:61:4 vinyl acetate: butyl acrylate:NMA. | 40 | 10:0.5:8 ethyl acetate: methyl alcohol:toluene. |
| 3 | ----do---- | 40 | ----do---- | 50:50:4 vinyl acetate: octyl acrylate:NMA. | 40 | 10:0.5:8 ethyl acetate: methyl alcohol:isopropyl alcohol. |
| 4 | ----do---- | 40 | ----do---- | 100:4 polyethyl acrylate: NMA. | 50 | Ethyl acetate. |

All of the above described formulations exhibited outstanding properties of pressure sensitivity, tack and cohesive strength at temperatures as high as 450° F.

Additional novel polymer blends were prepared by the above described procedures, wherein the concentrations of the respective monomer components in the non-crosslinkable copolymer were varied within the following ranges: 4 to 10 parts of maleic anhydride, 55 to 80 parts of octyl acrylate, 5 to 20 parts of ethyl acrylate and 10 to 30 parts of vinyl acetate. On exposure to elevated temperatures, the resulting polymer blends displayed adhesive properties which were generally comparable to those indicated for the above described products.

The procedure as set forth above, was also employed to prepare a number of additional polymer blends. Thus, all of the formulations set forth in the table above, were duplicated with the exception, however, that catalytic agents were not included therein to accelerate their curing. In each instance, the formulations prepared without catalysts exhibited properties which were comparable to those of the corresponding formulations which contained a catalyst. It should be noted, however, that the utilization of catalytic agents is the preferred approach.

*Example II*

This example illustrates the necessity of employing each of the components of our novel polymer blends in order to attain formulations which exhibit extraordinary characteristics of tack, tack retention, adhesive strength and cohesive strength at temperatures as high as 450° F. It further illustrates the range of ratios of non-crosslinkable to crosslinkable copolymers utilizable in the novel polymer blends of this invention.

The copolymer systems used in this example, were identical to Formulation #1 of Example I, hereinabove. The variable, as indicated in the table below, was the ratio of non-crosslinkable copolymer to crosslinkable copolymer.

In order to test the adhesive properties of the novel compositions of this invention at various elevated temperatures, the amount of creep, i.e., the deformation occurring in an adhesive bonded specimen under stress and over a period of time, was determined using the following test assembly and procedure.

The test samples were prepared by applying three mil wet films of the lacquers to strips of aluminum foil, 10 inches long, ½ inch wide and 3 mils thick. These foil laminates were applied to 20 gauge stainless steel plates and aged for one hour at room temperature. The test strips were marked at distances of ⅛″, ¼″, ½″, 1″ and then at every successive inch. The films were stripped back to the first mark, leaving a 1½ inch portion of the sample extending downward to which a 20 gram weight was secured. Thermocouple wires were attached to the steel plates in order to accurately determine the temperature of the system. The entire assembly was then mounted horizontally in an oven at 140° F. and 15 minutes were allotted for the plate to attain equilibrium at 140° F. The temperature of the oven was then increased in increments of from about 5 to 8° F. per minute and observations were noted as to the amount of film which pulled away from the plate at each succeeding temperature level. These results are summarized in the table below.

| Percent, by weight of Non-crosslinkable Copolymer in Blend | Amount of Creep (inches) at— | | | |
|---|---|---|---|---|
| | 275° F. | 300° F. | 350° F. | 400° F. |
| 48.5 | 0 | 0 | 0 | 0 |
| 64.4 | 0 | 0 | 0 | 0 |
| 71.5 | 0 | 0 | 0 | 0 |
| 75.0 | 0 | 0 | 0 | 0 |
| 77.8 | 0 | 0 | 0 | 0 |
| 80.0 | 0 | 0 | 0 | 1 |
| 83.3 | 0 | ¼ | 1 | 1 |
| 85.7 | 0 | 1 | 8 | (¹) |
| 0 | (¹) | | | |
| 100.0 | 2½ | 7 | (¹) | |

¹ Completely stripped from plate.

The above results clearly indicate excellent adhesive performance at elevated temperatures on the part of the compositions of this invention. They further indicates the need for employing both components of our novel adhesive systems.

*Example III*

This example illustrates the advantages derived from the use of the specified non-crosslinkable copolymer component in the novel blends of this invention in applications where heat resistant, pressure sensitive adhesive systems are required.

Thus, a typical adhesive composition of this invention, i.e., Formulation A, was compared with a typical blend, i.e., Formulation B, which was prepared according to the procedure described in our copending application, Serial No. 207,815, filed July 5, 1962, now Patent No. 3,222,419, patented December 7, 1965. A test procedure identical to that described in Example II, hereinabove, was used to effectuate the comparison.

| Formulation | Composition of Blend | | | | | |
|---|---|---|---|---|---|---|
| | Non-crosslinkable Copolymer Lacquer | | | Crosslinkable Copolymer Lacquer | | |
| | Copolymer Composition | Percent Polymer Solids | Solvent Blend | Copolymer Composition | Percent Polymer Solids | Solvent Blend |
| A | 20:70:10:7.5 vinyl acetate: octyl acrylate: ethyl acrylate: maleic anhydride. | 40 | 1:1 methylene chloride: toluene. | 20:30:50:4 vinyl acetate: octyl acrylate: ethyl acrylate: NMA (N-methylol acrylamide). | 45 | 1.75:2.25:1 methyl alcohol: isopropyl acetate: N-propanol. |
| B | 20:30:50 vinyl acetate: octyl acrylate: ethyl acrylate. | 40 | 1.75:2.25:1 methyl alcohol: isopropyl acetate: N-propanol. | 20:30:50:4 vinyl acetate: octyl acrylate: ethyl acrylate: NMA. | 45 | 1.75:2.25:1 methyl alcohol: isopropyl acetate: N-propanol. |

The results, summarized below, clearly indicate substantially better adhesive performance at elevated temperatures on the part of the novel blends of this invention.

| Formulation | Percent by weight of Non-crosslinkable Copolymer in Blend | Amount of Creep (inches) at— | | |
|---|---|---|---|---|
| | | 275° F. | 300° F. | 350° F. |
| A | 48.5 | 0 | 0 | 0 |
| | 64.4 | 0 | 0 | 0 |
| | 75.0 | 0 | 0 | 0 |
| B | 50.0 | (¹) | | |
| | 66.6 | (¹) | | |
| | 75.0 | 6 | (¹) | |

¹ Completely stripped from plate.

Summarizing, it is thus seen that this invention provides for the preparation of polymer blends ideally suited for use as pressure sensitive adhesives which retain their superior properties at elevated temperatures. Variations may be made in proportions, procedures and materials without departing from the scope of this invention as defined by the following claims.

We claim:

1. A pressure sensitive adhesive composition comprising a mixture of: (a) a linear copolymer of maleic anhydride, vinyl acetate, octyl acrylate and ethyl acrylate; and (b) a crosslinkable copolymer capable of becoming crosslinked when heated at temperatures in the range of 150–275° F.; said crosslinkable copolymer comprising a copolymer of at least one monomer selected from the group consisting of vinyl acetate, and alkyl esters of acrylic and methacrylic acid wherein said alkyl groups contain from 2 to 8 carbon atoms, together with at least one crosslinkable comonomer selected from the group consisting of N-methylol acrylamide, and N-methylol methylacrylamide.

2. The adhesive composition of claim 1, wherein the respective comonomers are present in said linear copolymer (a) in the following range of proportions as based on the total weight of the linear copolymer: maleic anhydride 4 to 10 parts, vinyl acetate 10 to 30 parts, octyl acrylate 55 to 80 parts, ethyl acrylate 5 to 20 parts; said linear copolymer having a glass transition temperature of from about −45 to −65° C. and a preferred intrinsic viscosity, in acetone at 25° C., of at least 0.90.

3. The adhesive composition of claim 1, wherein said crosslinkable copolymer (b) contains from about 0.5 to 10% by weight of at least one of said crosslinkable comonomer group, as based on the weight of the resulting copolymer.

4. The adhesive composition of claim 1, wherein the ratio of the polymer solids of said linear copolymer (a) to the polymer solid of said crosslinkable copolymer (b) ranges from about 50:50 to 90:10, by weight.

5. The adhesive composition of claim 1, wherein said mixture is dissolved in an organic solvent.

6. A pressure sensitive adhesive composition comprising a mixture of: (a) a linear copolymer of maleic anhydride, vinyl acetate, octyl acrylate, and ethyl acrylate, wherein the latter comonomers are present in a ratio, by weight, of 7.5:20:70:10; and (b) a crosslinkable copolymer capable of becoming crosslinked when heated at temperatures in the range of 150–275° F.; said crosslinkable copolymer comprising a copolymer of at least one monomer selected from the group consisting of vinyl acetate, and alkyl esters of acrylic and methacrylic acid wherein said alkyl groups contain from 2 to 8 carbon atoms, together with at least one crosslinkable comonomer selected from the group consisting of N-methylol acrylamide and N-methylol methacrylamide.

7. The adhesive composition of claim 6, wherein said linear copolymer (a) has a glass transition temperature of from about −45 to −65° C. and a preferred intrinsic viscosity, in acetone at 25° C., of at least 0.90.

8. The adhesive composition of claim 6, wherein said crosslinkable copolymer (b) contains from about 0.5 to 10% by weight of at least one of said crosslinkable comonomer group, as based on the weight of the resulting copolymer.

9. The adhesive composition of claim 6, wherein the ratio of the polymer solids of said linear copolymer (a) to the polymer solids of said crosslinkable copolymer (b) ranges from about 50:50 to 90:10, by weight.

10. The adhesive composition of claim 6, wherein said mixture is dissolved in an organic solvent.

11. A substrate coated with a pressure sensitive film comprising the dried, consolidated residue of an adhesive composition comprising a mixture of: (a) a linear copolymer of maleic anhydride, vinyl acetate, octyl acrylate, and ethyl acrylate; and (b) a crosslinkable copolymer capable of becoming crosslinked when heated at temperatures in the range of 150–275° F.; said crosslinkable copolymer comprising a copolymer of at least one monomer selected from the group consisting of vinyl acetate, and alkyl esters of acrylic and methacrylic acid wherein said alkyl groups contain from 2 to 8 carbon atoms, together with at least one crosslinkable comonomer selected from the group consisting of N-methylol acrylamide and N-methylol methacrylamide.

12. The substrate of claim 11, wherein the respective comonomers are present in said linear copolymer (a) in the following range of proportions as based upon the total weight of the linear copolymer: maleic anhydride 4 to 10 parts, vinyl acetate 10 to 30 parts, octyl acrylate 55 to 80 parts, ethyl acrylate 5 to 20 parts; said linear copolymer having a glass transition temperature of from about −45 to −65° C. and a preferred intrinsic viscosity, in acetone at 25° C., of at least 0.90.

13. The substrate of claim 11, wherein said crosslinkable copolymer (b) contains from about 0.5 to 10% by weight of at least one of said crosslinkable comonomer group, as based on the weight of the resulting copolymer.

14. The substrate of claim 11, wherein the ratio of the polymer solids of said linear copolymer (a) to the polymer solids of said crosslinkable copolymer (b) ranges from about 50:50 to 90:10, by weight.

15. The substrate of claim 11, wherein the crosslinkable copolymer (b) component of said mixture has been crosslinked.

16. A substrate coated with a pressure sensitive film comprising the dried, consolidated residue of an adhesive composition comprising a mixture of: (a) a linear copolymer of maleic anhydride, vinyl acetate, octyl acrylate, and ethyl acrylate, wherein the latter comonomers are present in a ratio, by weight of 7.5:20:70:10; and (b) a crosslinkable copolymer capable of becoming crosslinked when heated at temperatures in the range of 150–275° F.; said crosslinkable copolymer comprising a copolymer of at least one monomer selected from the group consisting of vinyl acetate, and alkyl esters of acrylic and methacrylic acid wherein said alkyl groups contain from 2 to 8 carbon atoms, together with at least one crosslinkable comonomer selected from the group consisting of N-methylol acrylamide and N-methylol methacrylamide.

17. The substrate of claim 16, wherein said linear copolymer (a) has a glass transition temperature of from about −45 to −65° C. and a preferred intrinsic viscosity, in acetone at 25° C., of at least 0.90.

18. The substrate of claim 16, wherein said crosslinkable copolymer (b) contains from about 0.5 to 10% by weight of at least one of said crosslinkable comonomer group, as based on the weight of the resulting copolymer.

19. The substrate of claim 16, wherein the ratio of the polymer solids of said linear copolymer (a) to the polymer solids of said crosslinkable copolymer (b) ranges from about 50:50 to 90:10, by weight.

20. The substrate of claim 16, wherein the crosslinkable copolymer (b) component of said mixture has been crosslinked.

No references cited.

MURRAY TILLMAN, *Primary Examiner.*

J. WHITE, *Examiner.*